Feb. 21, 1956     C. E. HOWARD     2,735,312
ACCELERATOR PEDAL OPERATING ATTACHMENT FOR MOTOR VEHICLES
Filed March 19, 1953
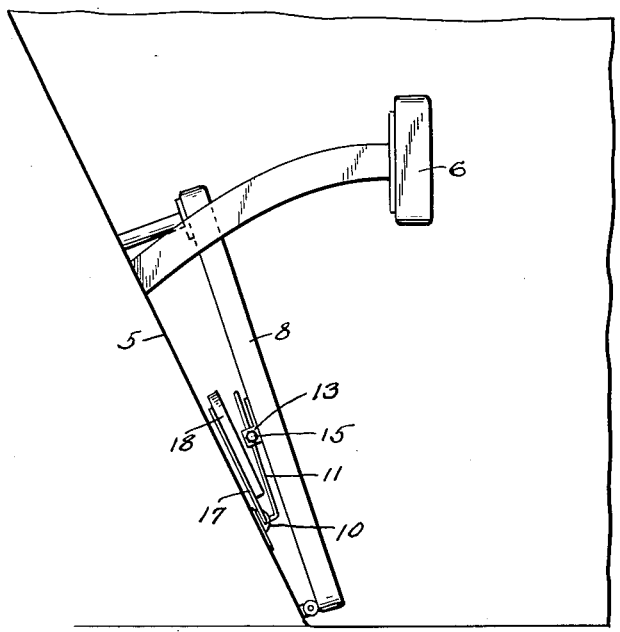
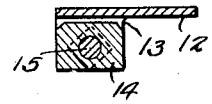
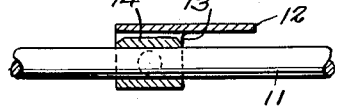
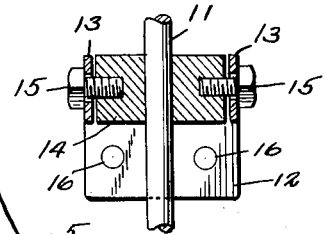
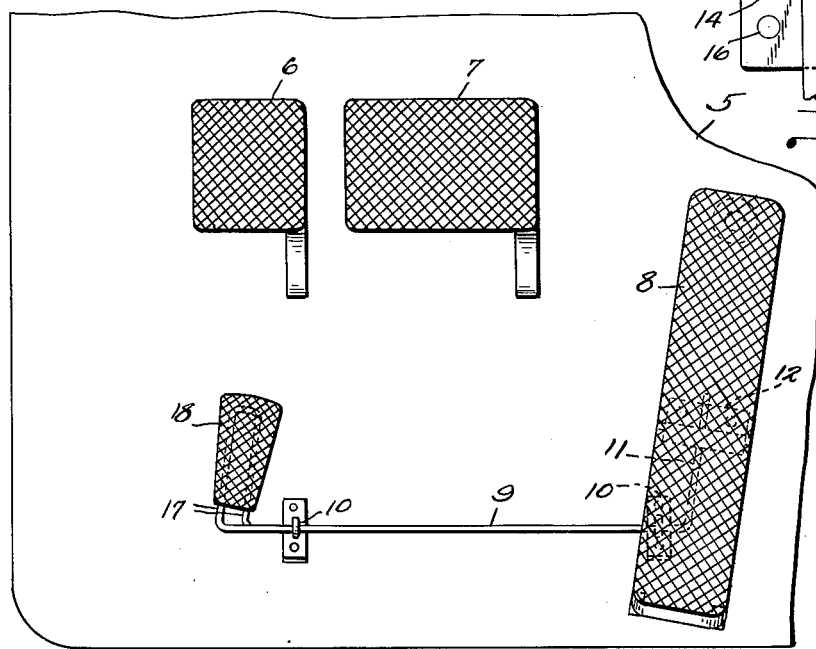
C. E. Howard
INVENTOR
BY *C. A. Snow & Co.*
ATTORNEYS.

United States Patent Office 2,735,312
Patented Feb. 21, 1956

2,735,312
ACCELERATOR PEDAL OPERATING ATTACHMENT FOR MOTOR VEHICLES

Charles E. Howard, Troy, N. C.

Application March 19, 1953, Serial No. 343,375

3 Claims. (Cl. 74—562.5)

This invention relates to an attachment designed for use in connection with the foot accelerator pedals of motor vehicles, the attachment providing means for effecting the operation of the conventional accelerator pedal, by the left foot, thereby relieving the operator of the vehicle of the discomfort incident to the continuous operation of the accelerator pedal with the right foot, particularly during long driving periods.

An important object of the invention is to provide a device of this character which may be readily and easily installed without the necessity of employing the services of a mechanic.

A further object of the invention is to provide an attachment which is formed with a right-angled end for slidable contact with the lower surface of the accelerator pedal, providing a connection which is invisible and does not detract from the appearance of the accelerator pedal.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of an accelerator pedal illustrating an attachment constructed in accordance with the invention, as mounted on the floor board and connected thereto.

Fig. 2 is a plan view of the accelerator pedal with attachment connected thereto.

Fig. 3 is a transverse sectional view through the attaching member used in connecting the attachment to the accelerator pedal for sliding movement.

Fig. 4 is a sectional view taken on line 4—4 of Fig. 3.

Fig. 5 is a sectional view taken on line 5—5 of Fig. 3.

Fig. 6 is a sectional view taken on line 6—6 of Fig. 3.

Referring to the drawing in detail, the reference character 5 indicates the conventional floor board of a motor vehicle, and the reference characters 6 and 7 indicate the usual clutch pedal and brake pedal respectively.

The accelerator pedal is indicated by the reference character 8 and is mounted in the usual manner for controlling the supply of gas to the engine of the motor vehicle.

The attachment forming the subject matter of the present invention, comprises the rod 9 which is mounted in the bearings 10 secured to the floor board, as clearly shown by Fig. 2 of the drawings.

One end of the rod 9 extends laterally providing an attaching arm 11, the attaching arm being secured to the under surface of the accelerator pedal 8, by means of the bracket 12 which is formed with right-angled ends 13 which fit over the ends of the bearing block 14, the right-angled ends having openings through which the threaded bolts 15 extend.

These threaded bolts 15 are threaded into openings formed in the ends of said bearing block 14 in such a way that the bearing block may tilt within the bracket 12.

As shown, the bracket 12 is formed with openings 16 through which suitable securing screws are extended, the screws passing into openings formed in the lower surface of the accelerator pedal, securing the bracket in position.

The bearing block 14 is provided with an opening extending transversely therethrough, and in which the attaching arm 11 is positioned, the attaching arm 11 being mounted in said opening, to compensate for the movement of the accelerator pedal, which moves in the arc of a circle when in operation.

The opposite end of the rod 9 is formed to provide a pair of spaced members 17, to which the rubber pad 18 is secured, providing an auxiliary accelerator pedal so located that it will fall directly under the left foot of the operator of the vehicle, to the end that when the operator desires to relieve the muscles of the right foot he may by placing his foot on the pad 18, operate the accelerator pad 18 with the left foot, relieving the right foot and leg of the operator of undue strain, caused by operating the accelerator pedal with the right foot for a long period of time.

Due to the construction shown by applicant it will be obvious that under normal conditions the main accelerator pedal may be operated in the usual manner, the connection between the actuating arm 11 and accelerator pedal 8 being such as to permit a sliding movement between the attaching arm and accelerator pedal.

Having thus described the invention, what is claimed is:

1. The combination with the accelerator pedal and floor board of a motor vehicle, of an accelerator operating attachment, comprising a rod, means for pivotally mounting said rod on such floor board, a bracket secured to the under surface of said accelerator pedal, a bearing block pivotally mounted within said bracket, said bearing block having an opening through which one end of said rod extends, pivotally connecting said rod with the said accelerator pedal, and the other end of said rod providing an auxiliary accelerator pedal for movement of the first-mentioned accelerator pedal.

2. The combination with the accelerator pedal and floor board of a motor vehicle, of an accelerator pedal operating attachment, comprising a rod, means for pivotally connecting said rod to such floor board, a bracket secured to the under surface of the accelerator pedal, a bearing block pivotally mounted within said bearing, said bearing block having an opening through which one end of said rod extends, the other end of said rod being extended laterally providing an auxiliary operating means for operating said accelerator pedal.

3. The combination with the accelerator pedal and floor board of a motor vehicle, of an accelerator operating attachment comprising a rod, the ends of said rod being extended laterally, one of said ends constituting an attaching arm, a bracket comprising a plate secured to the under surface of said accelerator pedal, laterally extended end members formed on the bracket having openings, a bearing block fitted between said end members of the bracket, bolts extending through the openings of said end members of the bracket, the bolts being embedded in the bearing block pivotally mounting the bearing block in said bracket, said bearing block having an opening into which said attaching arm extends slidably connecting the attaching arm to said accelerator pedal, and one end of said rod constituting an accelerator pedal for effecting operation of the accelerator pedal.

References Cited in the file of this patent

UNITED STATES PATENTS

| | | |
|---|---|---|
| 2,202,126 | Tercero | May 28, 1940 |
| 2,430,561 | Fletcher | Nov. 11, 1947 |
| 2,645,948 | Beckman | July 21, 1953 |